Feb. 6, 1951 W. R. KOCH 2,540,892
STANDOFF TRANSMISSION LINE
Filed July 8, 1948
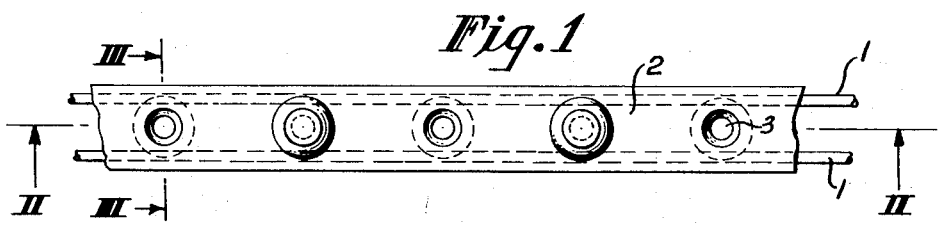
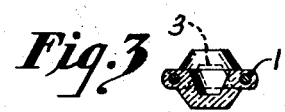 
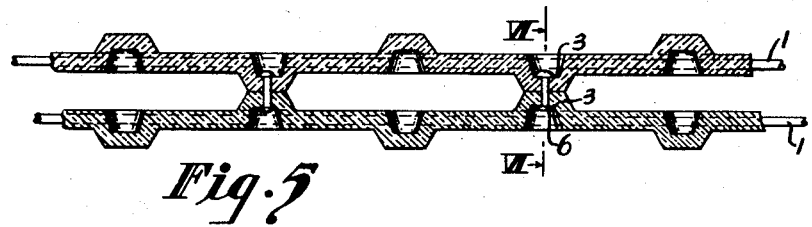
INVENTOR
WINFIELD R. KOCH
BY Conder C. Henry
ATTORNEY Patented Feb. 6, 1951

2,540,892

UNITED STATES PATENT OFFICE 2,540,892

STANDOFF TRANSMISSION LINE

Winfield R. Koch, Marlton, N. J., assignor to Radio Corporation of America, a corporation of Delaware Application July 8, 1948, Serial No. 37,575

4 Claims. (Cl. 174—27)

This invention relates to an improved type of insulated transmission line and more particularly to an insulated antenna lead in line in the form of a tape having a minimum of electrical interaction.

Heretofore transmission lines or cables used in carrying electrical current have been insulated in a variety of ways. Single strand wire has been provided with flexible rubber or plastic sheathing and in some cases has incorporated a metal tube or conduit surrounding the line and serving to insulate the wire from outside electrical interference. In such arrangements the insulated wires have sometimes been maintained within the metal tubing by suitable spacers. In cases where two or more insulated wires are used in a tubing, the wires have been maintained insulated from each other as well as from the surrounding metal tubing. In almost every such case the wires have been maintained insulated by means of spacing bulk heads or by having the insulation of such thickness between the wires and the tubing that a friction fit is achieved and low interference is maintained.

Such arrangements as those mentioned above have proved useful where not only extreme electrical disturbances exist but severe climatic conditions have made it imperative to give the line a high degree of protection. It has been observed by this inventor, however, that such transmission lines require special handling in their installation and may require special holding brackets. Moreover, such lines are expensive to manufacture and in their upkeep.

It is a well-known fact that reflection in transmission lines may not only cause interference between conductors in which there is a definite amount of electrical linkage but also reflections from the conductors and other objects may cause unwanted distortion. If the ordinary transmission line is fastened to a surface, the characteristic impedance will be changed where it touches the surface and reflections may occur. In addition any tack used to secure the line to the surface, because of its proximity to the conductor, may give a small reflection. The ordinary transmission line has a further disadvantage when attached to a surface in that its flashover voltage is low.

In general this invention utilizes the construction of the insulating material in the line as the means not only to carry the conductors but also as the insulating means for separating the conductors from the surface to which the line is attached.

There are sheathing machines in use today which utilize a crimping action on two plastic strips to put insulation on electrical conductors. This crimping action is imparted by having a sandwich of two layers of insulation with the conductor between the layers of insulation pass through a system of rollers. Such machines can be adapted easily to produce the tape of this invention. Insulation cups can be formed in the tape merely by having suitably spaced mounds and receiving depressions on the rollers and passing the insulation and wire sandwich through the rollers while the insulation is in a semi-plastic condition. Suitable cooling and hardening processes can then be used to impart to the tape the desired final properties.

My transmission line comprises essentially an elongated more or less flat strip or tape of insulating material having conductors incorporated therein. The insulating material has cups formed or placed therein on both sides thereof, the cups on one side extending in opposite directions from the cups on the other side. Because these cups are arranged both above and below the line of interaction between the conductors, the cups on one side of the tape may facilitate securing the line to a surface while to those on the other side may be secured a second similar line in order to form a dual four wire unit. This arrangement allows the use of four conductors in a well insulated arrangement.

Not only are the conductors incorporated in the lines effectively insulated from one another, but they are also insulated from any outside metallic interference such as from the rivets or bolts used to join the sets of conductors and the nails or tacks used to secure the whole unit to the surface or any other energy reflective surface.

It is therefore an object of my invention to inexpensively produce an effectively insulated transmission line in which the conductors are separated electrically from each other and from any outside source of interference.

It is another object of my invention to provide a transmission line constructed so that the conductors are held in spaced relationship and effectively insulated from each other and any outside metal surface or object.

Still another object of my invention lies in the construction of the line which contains the means for achieving a maximum of insulation without the use of auxiliary spacers or shielding tubing.

Another object of my invention is the provision whereby the heads of the tacks which are used to secure the tape to a surface are outside the line of interaction between the conductors and at a position where reflective interference is minimized.

A further object of my invention is the provision of means whereby the transmission line may be simply yet effectively secured to any holding surface.

A still further object of my invention is the provision of means whereby a composite transmission line may be simply and easily constructed from basic units in such a manner as to reduce the attenuation and pick up or radiation that may occur in a two wire line.

The above and other objects and advantages of my invention will become apparent upon a consideration of the following detailed description taken in conjunction with the accompanying drawings, in which—

Figure 1 represents a top view of a preferred embodiment of my invention;

Figure 2 represents a longitudinal cross-sectional view taken along the line 2—2 of Figure 1;

Figure 3 represents a vertical cross-sectional view taken along the line 3—3 of Figure 1;

Figure 4 shows the manner of securing the two wire unit to a surface;

Figure 5 represents a longitudinal cross-sectional view of a four wire arrangement, and Figure 6 represents a vertical cross-sectional view of the four wire system, taken along the line 6—6 of Figure 5.

In the following descriptions like parts are represented by like numerals in the drawing.

Referring specifically to Figures 1, 2 and 3, of the drawing, conductors 1 are disposed in the insulating plastic tape 2. Plastic insulating cups 3 are formed in the tape in such manner that alternate cups will open upwardly and downwardly, respectively. The bottoms of the cups opening in one direction have their bottoms displaced from the line of interaction of the conductors to constitute legs by which the conductors will be spaced from a supporting surface to thereby minimize any change of electrical interference caused by reflections from the surface or from any metallic object, such as a nail head in the surface.

A preferred method of securing the transmission line to a surface consists of having tacks 4 driven through the bottom insulating cups 3 into a surface 5.

In the preferred embodiment of a four wire arrangement of the transmission line, two units each provided with two wires are joined by rivets 6, which pierce the top cups of the lower unit and the bottom cups of the upper unit, the lines being so placed that the lower cups of the top line are directly above the upper cups of the bottom line. Thus the two lines are positioned to be joined at the points where the cups touch by means of rivets or by any other suitable means.

The lower cups of the bottom line are utilized to attach the unit to a surface by means of nails, or some similar means driven through the lower cups into a holding surface.

This method of joining the two units produces a steady transmission line. The four wire line so constructed is not primarily to carry two signals, but to reduce attenuation and pick-up or radiation that can occur with a two wire line. Accordingly the diagonally opposite conductors are connected together at the ends, and therefore carry equal currents in the same direction.

With a two wire line, at a given point in the plane of the wires, there will exist a small field, due to radiation from the line; because, although the currents in the line are equal and opposite, the spacing between wires is a small fraction of a wavelength, and the resulting fields that arrive at the given point, although equal, are not quite opposite in phase angle. With a four wire line the added wires, with reversed polarity, give complete cancellation of the fields.

This improvement becomes of greater importance at higher frequencies, where a given spacing becomes a greater fraction of a wavelength. It is impractical to reduce the wire spacing to accomplish this effect since this would reduce the characteristic impedance of the line and increase the current in the line, which, in turn, would cause an increase in the attenuation.

A two wire line as described can be easily rolled up for transportation and fastened together where needed to form a four wire line. A unitary four wire line would be difficult to coil up for transportation and requires separate stocks in the stores.

Obviously many modifications and variations of the present invention are possible in the light of the above teachings. It is therefore to be understood that within the scope of the appended claims the invention may be practical otherwise than as specifically disclosed herein.

I claim:

1. A transmission line comprising in combination, a conductor, a flat strip of insulating material, said conductor being embedded in said insulating material parallel to the sides thereof, said flat strip being provided with projecting cups extending perpendicularly from the plane of said material, the bottoms of said cups being remote from the plane of said material, alternate one of said cups extending on opposite sides of said plane.

2. A transmission line comprising in combination, a plurality of conductors, a flat strip of insulating material in which said conductors are embedded, said conductors being parallel to the sides of said flat strip, said flat strip being provided with projecting cups extending perpendicularly from the plane of said material, the bottoms of said cups being remote from the plane of said material, alternate ones of said cups extending on opposite sides of said plane.

3. A composite transmission line composed of a plurality of similar lines, each having in combination a conductor, a flat strip of insulating material in which said conductor is embedded, each of said conductors being parallel to the sides of said flat strip, each of said flat strips being provided with projecting cups extending perpendicularly from the plane of said strip, the bottoms of said cups being remote from the plane of said strip, the lower cups of one of said lines being in contact with the upper cups of another of said lines.

4. A composite transmission line composed of a plurality of similar lines, each of said similar lines comprising in combination a plurality of conductors, a flat strip of insulating material in which said conductors are embedded, said conductors being parallel to the sides of said flat strip, said strip being provided with projecting cups extending perpendicularly from the plane of said material, the bottoms of said cups being remote from the plane of said material and the lower cups of one of said lines being in contact with the upper cups of another of said lines.

WINFIELD R. KOCH.

REFERENCES CITED

The following references are of record in the file of this patent:

UNITED STATES PATENTS

| Number | Name | Date |
|---|---|---|
| 286,698 | Henley | Oct. 16, 1883 |
| 1,823,885 | Cherry | Sept. 22, 1931 |
| 1,841,257 | Schemmel | Jan. 12, 1932 |
| 1,949,169 | McCrea | Feb. 27, 1934 |

FOREIGN PATENTS

| Number | Country | Date |
|---|---|---|
| 92,736 | Austria | May 25, 1923 |
| 485,400 | England | May 19, 1938 |
| 607,122 | Germany | Dec. 18, 1934 |

Certificate of Correction

Patent No. 2,540,892                         February 6, 1951

WINFIELD R. KOCH

It is hereby certified that error appears in the printed specification of the above numbered patent requiring correction as follows:

Column 4, line 51, for the word "one" read *ones*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*